June 5, 1962  R. C. BOWERS ET AL  3,037,599
CLUTCH
Filed Aug. 14, 1957  4 Sheets-Sheet 1
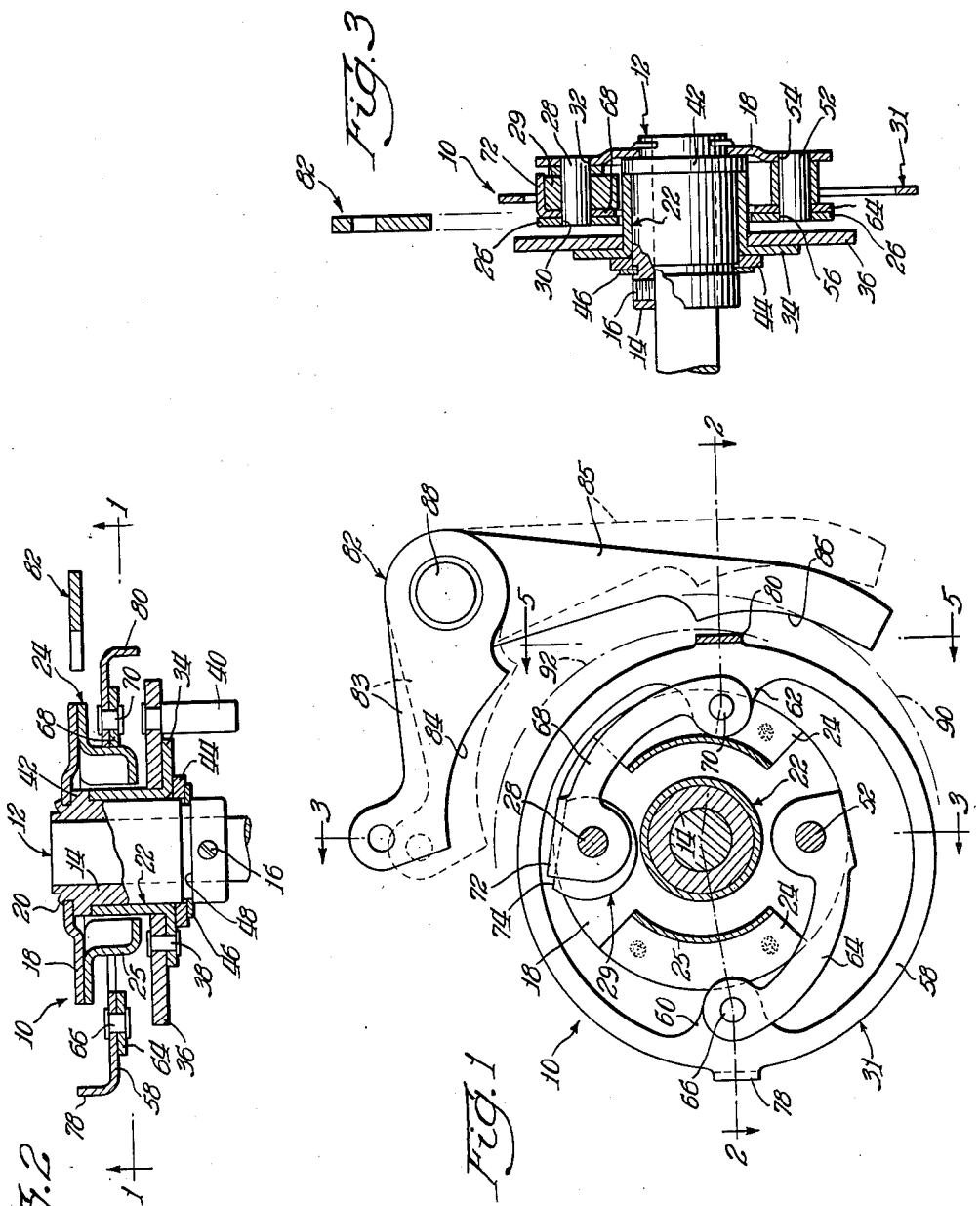
Inventors:
Roy C. Bowers and
Raymond J. Boedigheimer
By: Francis T. Drum  Atty.

June 5, 1962  R. C. BOWERS ET AL  3,037,599
CLUTCH
Filed Aug. 14, 1957  4 Sheets-Sheet 2

Inventors:
Roy C. Bowers and
Raymond J. Boedigheimer
By: Francis T. Drum Atty.

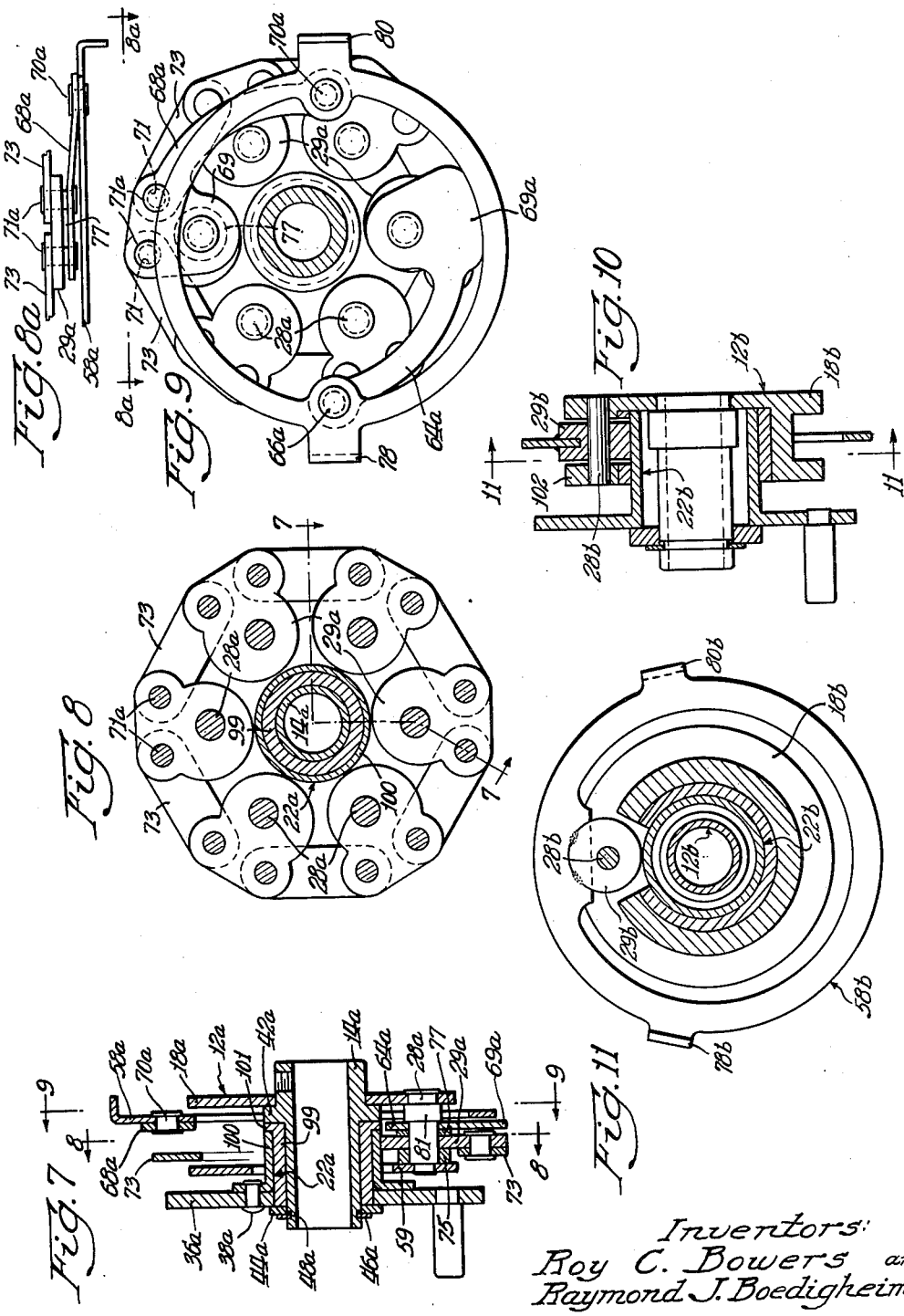

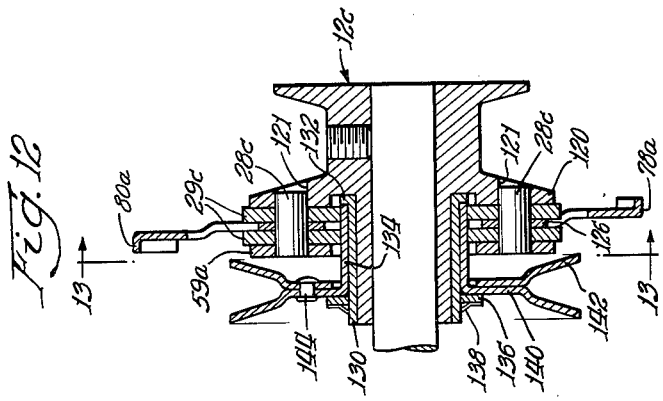
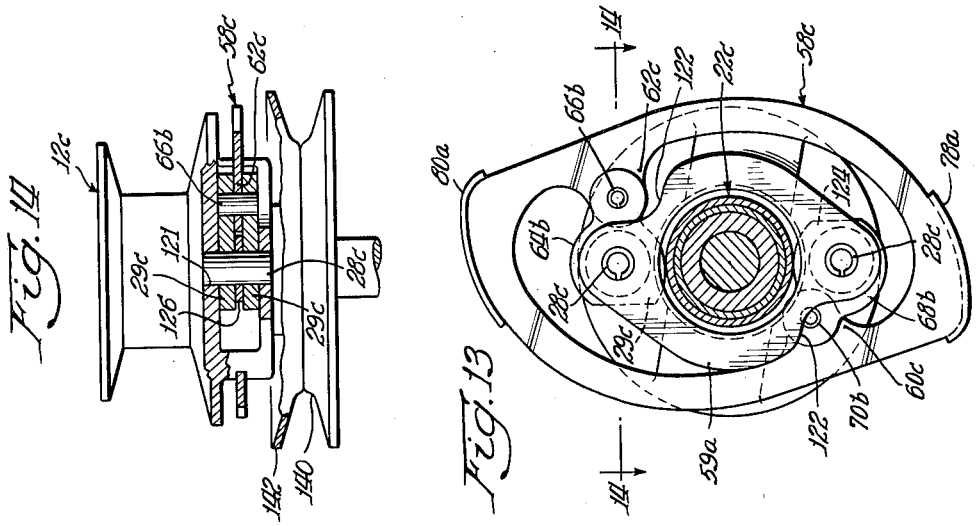

United States Patent Office 3,037,599
Patented June 5, 1962

3,037,599
CLUTCH
Roy C. Bowers, Cooperstown, N.Y., and Raymond J. Boedigheimer, Chicago, Ill., assignors to Borg-Warner Corporation, Chicago, Ill., a corporation of Illinois
Filed Aug. 14, 1957, Ser. No. 678,187
19 Claims. (Cl. 192—26)

This invention relates to clutches and more particularly to a clutch of the gripper type in which concentric driving and driven elements may be selectively connected.

A principal object of the invention is to provide a clutch of the stated type which is characterized by ease and economy of manufacture and efficiency and effectiveness in use.

Another object of the invention is to provide a clutch of the mentioned character wherein an eccentric gripper may be tipped into or out of engagement with a driven member by a simple but effective control mechanism.

Another object of the invention is to provide a clutch of the gripper type in which the control mechanism is so constructed and arranged as to utilize the effect of centrifugal force to facilitate the movement of the gripper to, and stabilize the gripper in, one position or the other.

A more particular object of the invention is to provide a clutch of the gripper type in which the control means for rotating the gripper includes a control ring having diametrically opposed oppositely extending tabs selectively engageable by an external control assembly in a manner such that the centrifugal reactions of the control ring are utilized to position the gripper, and retain the gripper in a desired position.

Another object of the invention is to provide a clutch of the stated type in which a driving member and driven member are arranged in concentric relation and in which a plurality of grippers are pivotally mounted on the driving member and revolve therewith, in which means are provided for connecting the several grippers each to the other and in which means are provided for tilting the grippers in unison so that they simultaneously engage the driven element.

A further object of the invention is to provide a clutch of the revolving gripper type in which a control ring is connected directly to a gripper and wherein the ring may be conveniently moved to a position eccentric to the orbit of the gripper for rotating the gripper into or out of engagement with the driven member.

Another object of the invention is to provide a clutch of the gripper type wherein a control mechanism includes a rotating ring having a pair of diametrically opposed tabs extending axially oppositely from the periphery thereof, wherein a control assembly may be moved into engagement with one or the other of said tabs to urge the ring into an eccentric position in which the ring is subject to centrifugal reactions tending to stabilize the ring in that position, and wherein one or more grippers are rotated in response to the movement of the control ring for selectively engaging a driven member.

A further object of the invention is to provide a clutch of the stated type in which one of the tabs in either the engaged position or the disengaged position of the clutch rotates at a radius less than the normal radius of the ring in concentric position while the other tab rotates at a radius greater than the radius of the ring in concentric position so that the outer tab may be conveniently engaged by the control assembly.

Another object of the invention is to provide a clutch of the stated type in which the gripper is formed integrally with an arm pivotally connected to the control ring.

These and other objects and features of the invention will be apparent from the specification when taken with the accompanying drawings, in which;

FIGURE 1 is an elevational view partly in section of the clutch made in accordance with the present invention taken substantially on line 1—1 of FIGURE 2 and showing the constituent elements in the positions they assume when the gripper is disengaged;

FIGURE 2 is a view taken substantially on line 2—2 of FIGURE 1;

FIGURE 3 is a view taken substantially on line 3—3 of FIGURE 1;

FIGURE 7 is a sectional view taken substantially on line 7—7 of FIGURE 8 showing a modified form of the present invention;

FIGURE 8 is an elevational view partly in section taken substantially on line 8—8 of FIGURE 7;

FIGURE 8a is a fragmentary sectional view showing a detail of the structure of FIGURE 9 and taken substantially on line 8a—8a in that figure;

FIGURE 9 is an elevational view partly in section taken on line 9—9 of FIGURE 7;

FIGURE 10 is an elevational sectional view showing a clutch made in accordance with a further modified form of the present invention;

FIGURE 11 is a sectional view taken substantially on line 11—11 of FIGURE 10;

FIGURE 12 is an elevational sectional view of a clutch made in accordance with another modified form of the present invention;

FIGURE 13 is an elevational view, partly in section, taken substantially on line 13—13 of FIGURE 12; and FIGURE 14 is a sectional plan view taken substantially on line 14—14 of FIGURE 13.

Figure 6:
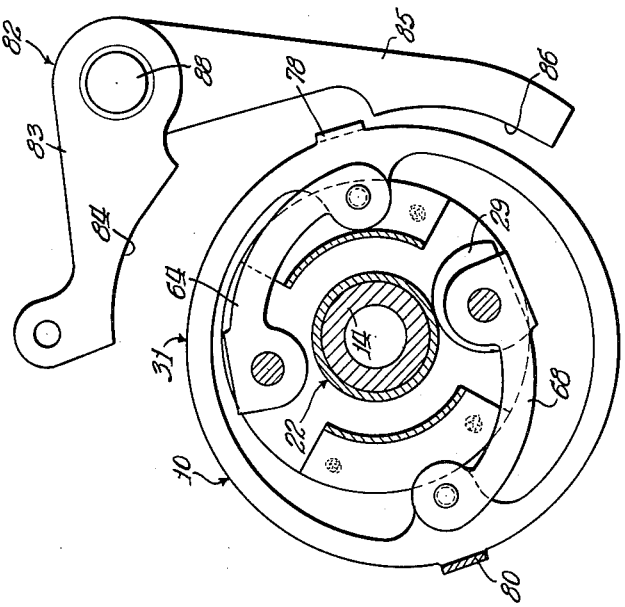
FIGURE 6 is a view similar to FIGURE 1 but showing the relative positions of the constituent elements when the gripper is fully engaged.

Referring now to the drawings and more particularly to FIGURES 1, 2 and 3 the clutch of the present invention is indicated generally by reference numeral 10 and comprises a driving element 12 which, in the present instance, includes a sleeve 14 which may be affixed to a motor shaft by means of a set screw 16, and a driving plate 18 fixed to the sleeve 14 by swedging or the like at flats 20. The sleeve 14 is desirably of bronze or other suitable bearing material since it serves as a bushing for a driven element 22 which is coaxial with the sleeve 14. A running clearance is provided between the driving and driven elements.

According to the present invention, the elements 12 and 22 may be selectively drivingly connected to impart rotational motion to any mechanism to which the element 22 may be connected. To this end, a support member 24 is affixed to the driving plate 18 by spot welding and the like, see FIGURES 2 and 3. The support member 24 has a pair of diametrically opposed ears 26 which extend radially outwardly from a hub 25 and in parallelism to the drive plate 18. A pin 28 extends between one of the ears 26 and the drive plate 18, suitable openings 30 and 32 being respectively provided in the ear 26 and the plate 18 for this purpose. The pin 28 may be conveniently pressed into the position shown in FIGURE 3. A gripper 29 of eccentric configuration is pivotally mounted on the pin 28 for selective engagement with the driven element 22. The gripper 29 revolves with the pin 28 as the drive plate 18 rotates, as is apparent. It will be appreciated that the position of the driven element is illustrative only; the driven element may be annular and the gripper 29 may be positioned within this annular driven element so as selectively to engage the inner periphery thereof. Instead of mounting the driven element on the driving sleeve, as shown, the driven element may be fixed to a shaft of the driven machine and the driving element journaled thereon.

The driven element or race 22 preferably takes the form of a drawn cup having an intergral flange 34 to which an output member 36 is secured by means of a plurality of circumferentially spaced rivets 38 (only one of which is shown in FIGURE 2). A plurality of studs 40 are mounted in spaced relation on the output member 36 for driving a driven mechanism by means which may take the form of a resilient ring or the like. It will be appreciated that a gear pulley or sprocket may be riveted directly to the output member 36, if desired. The driven element 22 is maintained in the axial position shown by means of a thrust flange 42 integral with the sleeve 14 and a thrust washer 44 which is retained in poistion by a snap ring 46 received in a peripheral groove 48 in the sleeve 14.

The gripper 29 is tiltable in a manner hereafter apparent to engage the outer periphery of the driven member 22 drivingly to connect the member 22 with the driving element 12. The configuration of the gripper 29 is such as to afford locking thereof with the periphery of the driven element 22 upon rotation thereof. A pin 52 is press fitted in openings 54 and 56 in the drive plate 18 and the other of the ears 26 respectively, for a purpose hereafter apparent.

According to an important feature of the present invention the gripper 29 may be tipped from the position shown in FIGURE 1 to the position shown in FIGURE 6 by centrifugal force after movement has been initiated mechanically by a control mechanism 31 which will now be described. The mechanism 31 includes a control ring 58 which has a pair of oppositely disposed coplanar inwardly extending ears 60 and 62. A control arm 64 is pivotally secured at one end to the ear 60 by means of a pin 66 and at the other end is pivotally secured to the pin 52. A gripper arm 68 is pivotally secured at one end to the ear 62 by means of a pin 70 and is pivotally secured at the other end to the pin 28. A flat tab 72 is integrally formed with the latter end of the gripper arm 68, extends perpendicular therefrom and engages a flat 74 on the gripper 29 so that when the arm 68 and the gripper 29 are in the assembled relation shown they are force to pivot in unison. Any motion of the gripper arm 68 is transmitted to the gripper 29 and vice versa. The control ring 58 may be moved in a direction perpendicular to the axis of the driving and driven elements to pivot the gripper arm 68 and the gripper 29 in a manner that will now be described.

Referring now more particularly to FIGURE 2, the control ring 58 has at its periphery a tab 78 extending perpendicularly in one direction from the plane of the ring and a tab 80 extending perpendicularly in the opposite direction from the plane of the ring. The tabs 78 and 80 may be selectively actuated by a control assembly, indicated generally by reference numeral 82 for movement of the gripper arm 68 and the gripper 29 from the position shown in FIGURE 1 to the positions shown in FIGURES 4 and 6. The control assembly 82 includes a first arm 83 having a ramp 84 and a second arm 85 having a ramp 86 pivotally mounted on a rotatable shaft 88 having a fixed position with respect to the axis of rotation of the driving and driven elements. The arms 83 and 85 are arranged to move in unison. The arm 83 and the ramp 84, however, are disposed in a plane coincident with the plane of tab 80 for disengaging the gripper 29 from the element 22 and the ramp 86 is arranged in a plane coincident with the plane of the tab 78 for engaging the gripper 29 with the element 22. The shaft 88 may be rotated to move the arms 83 and 85 through an arc indicated in dotted lines in FIGURE 1 by any suitable means such as an electromechanical or hydraulic actuator (not shown).

The tab 80 is located in limited spaced relation to the axis of the pin 70, and radially inward movement of the tab 80 in response to actuation by the ramp 84 affords clockwise rotation of the arm 68 about the pin 28, clockwise rotation of the gripper 29 and consequent disengagement of the gripper 29 from the driven element 22. The outer end of the arm 68 moves inwardly to a limit position in abutment with the hub 25 of the support 24. The outer end of the arm 64 moves away from the axis of rotation of the elements 12 and 22, the center of gravity of the control mechanism moves away from the axis of concentricity and due to centrifugal force there is a tendency to stabilize the gripper 29 in the disengaged position. Inward movement of the tab 78 in response to actuation by the ramp 86, effects radially outward movement of the pin 70 about which the gripper arm 68 pivots, and thus counter-clockwise rotation of the gripper 29 and engagement with the driven element 22 is afforded. As pointed out above, the movement of the control ring 58 to either of the eccentric positions indicated is effected by centrifugal force, the movement being initiated by mechanical actuation of the tab 78 or the tab 80. It will be appreciated that the control ring 58 would normally rotate concentrically with the driving element 12 in the absence of engagement of the tab 78 by the ramp 86 of the control assembly 82.

Figure 4:
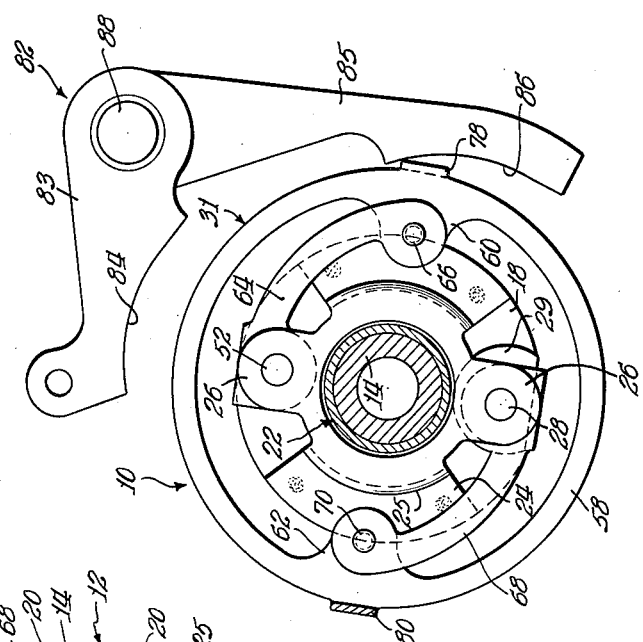
FIGURE 4 is a view similar to FIGURE 1 but showing the constituent elements in the positions they assume when the gripper is in neutral position.
Figure 5:
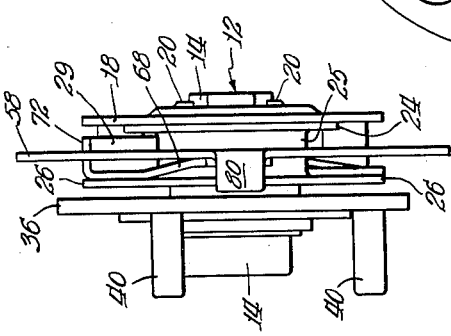
FIGURE 5 is a view taken substantially on line 5—5 of FIGURE 1.

In operation, the clutch of the present invention may be moved from the disengaged position shown in FIGURE 1 ultimately to the engaged position shown in FIGURE 6 by pivoting of the control assembly 82 from the position shown in dotted lines in FIGURE 1 to the position shown in solid lines. In this position, the ramp 86 is in the path of travel of the tab 78 and, as the tab 78 moves past the ramp 86 the control ring 58 is moved to the left, as viewed in that figure, thus effecting relative clockwise movement of the control arm 64 and consequent counter-clockwise movement of the gripper arm 68 and the gripper 29. In FIGURE 4 is shown an intermediate position in which the control ring 58 is concentric with the axis of the sleeve 14. In this position, the gripper 29 is almost in engagement with the driven member 22. The tabs 78 and 80 are equidistant from the axis of rotation of the driving and driven elements. It will be noted that the tab 78 in FIGURE 4 has not fully traversed the length of the ramp 86. After the tab 78 has traversed the ramp 86, the control ring 58 and the arms 64 and 68 assume the positions shown in FIGURE 6. The arm 68 is now in the outer position and centrifugal force, together with the gripper curvature, tends to stabilize the gripper 29 in the lock position. It will be noted that the tabs 78 and 80 clear both of the ramps of the control assembly 82. Torque will then be transmitted from the driving to the driven member.

To effect disengagement of the gripper 29, the control assembly 82 is moved to the position shown in dotted lines in FIGURE 1. In this position, the tab 78 clears the ramp 86. At the same time, the ramp 84 is in the path of travel of the tab 80 and upon engagement of these elements, the ring 58 is moved downwardly to the position shown in FIGURE 1 in which one end of the arm 68 contacts the hub 25 of the support member 24. The arm 68 is thus pivoted in a clockwise direction, the gripper 29 is pivoted or tilted in like manner and disengagement of the sleeve 14 from the driven member 22 is afforded.

It will be noted that in the disengaged position shown in FIGURE 1 and in the fully engaged position shown in FIGURE 6 the ramps 84 and 86 are out of the path of travel of both the tab 78 and the tab 80 and no contact occurs between the ramps and the tabs. In FIGURE 1, the path of travel of the tab 78, indicated by reference numeral 90, is outboard of the path of travel of the tab 80, indicated by reference numeral 92. As shown in that figure the control assembly 82 has already been moved to engage position. It will be understood that when the clutch is disengaged the assembly 82 normally resides in the dotted line position. In FIGURE 6, however, the assembly 82 has not yet been moved to disengage position.

In FIGURES 7, 8 and 9 is shown a modified form of the present invention in which a driven member 22a is selectively engaged by a plurality of grippers 29a pivotally mounted on pins 28a which are mounted in circumferentially spaced relation on a driving plate 18a of a driving element 12a and a support ring 59 spaced from the plate 18a. Each pin 28a has an integrally formed flange 81 for a purpose hereafter apparent. A control ring 58a is connected to the driving plate 18a by means of a control arm 64a pivotally mounted at one end about a pin 66a and at the other end about one of the pins 28a. A gripper arm 68a is pivoted at one end to a pin 70a and at the other end to one of the pins 28a. The arm 68a is provided at its inner end with an enlarged portion 69 generally conforming to the configuration of the gripper 29a and having a pair of openings 71 for reception of rivets or pins 71a for pivotally mounting phasing links 73. The arm 64a is similarly provided with an enlarged portion 69a. As shown best in FIGURE 8a the arm 68a is offset slightly from the ring 58a to provide clearance for the heads of the pins 71a. The arm 64a is similarly offset for the same reason. It will be noted that the grippers 29a are spaced from the ring 59 by washers 75 and that a washer 77 is interposed between the enlarged portion 69 of the arm 68a and the adjacent gripper 29a and between the enlarged portion 69a of the arm 64a and its associated gripper. The remainder of the grippers are suitably spaced axially by washers (not shown) of slightly greater thickness. It will be further noted that the portions 69 and 69a are maintained in abutment with the flange 81 by the washers 75 and 77 and that the grippers 29a are maintained in coplanar relation in the same manner.

Each of the several grippers 29a is connected to the adjacent grippers by means of the phasing links 73 so that upon pivotal movement of the gripper arm 68a in a manner similar to that of the principal form of the invention, all of the grippers 29a move in unison into or out of engagement with the driven member 22a. The clutch of the modified form of the invention is provided with tabs 78 and 80 as in the principal form of the invention and these tabs may be actuated by a control assembly of the type illustrated in conjunction with FIGURES 1, 4, and 6, as will be apparent.

The driving element 12a includes a sleeve 14a having an outwardly extending flange 42a against which the plate 18a is secured as by brazing or the like. The flange 42a axially positions the driven member 22a in cooperation with a washer 44a and a snap ring 46a which is positioned in a peripheral groove 48a in the surface of the sleeve 14a. In this instance, the driven member 22a includes a flanged cup 100 to which an output member 36a is secured by means of circumferentially spaced rivets 38a.

In FIGURES 10 and 11 is shown a further modified form of the present invention in which a driving member 12b, having a drive plate 18b, and a driven member 22b are arranged in a manner similar to the forms of the invention previously described. In this instance, however, a single gripper 29b is pivotally mounted on a pin 28b and a control ring 58b is connected directly to the gripper 29b by brazing or the like. A tab 78b is provided for urging the control ring inwardly to rotate the gripper 29b in a counter-clockwise direction to disengage the gripper from the driven member 22b. A tab 80b, circumferentially spaced from the tab 78b, is operative upon actuation by a control assembly of the type shown in conjunction with the principal form of the invention to pivot the gripper 29b in a clockwise direction into engagement with the driven member 22b. In this form of the invention, the drive plate 18b is integrally formed with a flange 102 and the pin 28b extends therebetween. As in the other forms of the invention illustrated, the mass of the ring 58b is subject to centrifugal force once the tab 78b of the tab 80b is actuated for disengagement or engagement of the clutch as the case may be. The clutch illustrated in FIGURES 10 and 11 is characterized by ease and simplicity of manufacture. The effect of centrifugal force acting on control ring 58b is such as to stabilize the gripper 29b in one position or the other.

Referring now to FIGURES 12–14 inclusive, there is shown a further modified form of the present invention in which a driving element 12c is provided with an integrally formed radially outwardly extending flange 120 having diametrically opposed openings 121 for reception of pins 28c which extend into registering openings in a confronting wall of a hollow boss 59a integrally formed with the flange 120. A pair of gripper arms 64b is pivotally mounted on one of the pins 28c and is connected by means of a pin 66b to an inwardly extending ear 62c of an irregularly formed control ring 58c. It will be noted that the arms 64b are positioned one on each side of the ear 62c of the control rings 58c to assure proper balance of the ring during rotation and to preclude binding. The control ring 58c is provided with an inwardly extending ear 60c having a suitable opening for reception of a pin 70b about which is pivoted a pair of control arms 68b. The control arms 68b are connected by means of another of the pins 28c to the flange 120.

Integrally formed with each of the arms 64b is a gripper 29c which, as in the other forms of the invention, is eccentrically shaped so that counterclockwise rotation thereof, as viewed in FIGURE 13, effects locking engagement with a driven element 22c.

In the form of the invention shown in FIGURES 12, 13 and 14 the driven element 22c is shown as having a bushing 130 provided at one end with a radially outwardly extending flange 132, a sleeve 134 mounted in surrounding relation to the bushing 130 and retained in abutment with the flange 132 by a thrust washer 136 and a retaining ring 138. The opposite end of the sleeve 134 has a radially outwardly extending flange 140, the outer end of which is shaped to form a half of a sheave, the other half being supplied by an annular ring 142 secured in position by circumferentially spaced rivets 144.

The inner ends of the control arms 68b form a reaction member 124 which cooperates with the grippers 29c. The reaction members may, if desired, be shaped as grippers and serve the same function as the grippers 29c.

A spacer 126 may be interposed between the grippers 29c to maintain the grippers in the relation shown. Elongated oppositely extending tabs 78a and 80a are provided at the extremities of the control rings 58c and function in the same manner as the tabs 78 and 80 in the principal form of the invention.

The clutch of the present invention is characterized by positive action once the movement of the gripping means is initiated externally since the control mechanism, once displaced from the concentric position, is acted upon by centrifugal force which then tends to move the mechanism to—and retain it in—a position beyond that to which it was urged. As a result, the engage tab and disengage tab of the several forms of the invention are normally out of contact with the arms of the external control assembly when the clutch is in engaged position or disengaged position but are selectively engaged by the ramps when a change is desired to the opposite condition of operation.

While we have described our invention in connection with certain specific embodiments thereof, it is to be understood that this is by way of illustration and not by way of limitation and the scope of our invention is defined solely by the appended claims which should be construed as broadly as the prior art will permit.

We claim:

1. A clutch comprising a rotatable driving member, a concentrically mounted driven member, centrifugally responsive means for selectively connecting said driving member and said driven member, and control means for initiating actuation of said centrifugally responsive means, said control means including means shiftable to positions eccentric to the axis of rotation of said driving member for rotating said first-named means in one direction or the other and a control assembly for shifting said last-named means.

2. A clutch comprising a rotatable driving member, a concentric driven member, a plurality of grippers rotatably mounted on said driving member and eccentrically mounted with respect to their axes of rotation on said driving member, means for selectively drivingly connecting said driven member with said driving member, said means including a control mechanism connected to said grippers and shiftable in response to centrifugal force for rotation of said grippers in one direction or the other to engage or disengage said driven member, and means including a control assembly for tipping said control mechanism to eccentric positions with respect to the axis of rotation of said driving member.

3. A clutch comprising a rotatable driving member, a concentric driven member, a plurality of grippers rotatably mounted on said driving member and eccentrically mounted with respect to their axes of rotation on said driving member, means for selectively drivingly engaging said driven member with said driving member, said means including a control mechanism having a control ring provided with a pair of diametrically opposed axially oppositely etxending peripheral tabs, said control mechanism being connected to said grippers and shiftable in response to centrifugal force for rotation of said grippers in one direction or the other to engage or disengage said driven member, and means including a control assembly having a first arm coplanar with one of said tabs and a second arm coplanar with the other of said tabs, said arms being simultaneously rotatable to engage one or the other of said tabs for tipping said control mechanism to eccentric positions with respect to the axis of rotation of said driving member.

4. A clutch comprising a rotatable driving member, a concentrically disposed driven member, a plurality of rotatably mounted grippers adapted to be revolved by said driving member, means connecting said grippers, and means for selectively rotating said grippers in unison into engagement with said driven member, said means including a control mechanism comprising a ring connected to said grippers, said ring being shiftable to one eccentric position with respect to the axis of rotation of said driving member for rotation of said gripper in one direction and shiftable to another eccentric position with respect to the axis of rotation of said driving member for rotation of said gripper in the other direction, said means further including a control assembly for effecting shifting of said ring.

5. A clutch comprising a driving member, a driven member mounted in concentric relation to said driving member characterized by the provision of at least one gripper rotatably mounted on said driving member and eccentrically mounted with respect to its axis of rotation on said driving member, and means for selectively rotating said gripper into locking engagement with said driven member for drivingly connecting said driving member and said driven member, said means including a control mechanism having a pair of diametrically opposed tabs extending axially in opposite directions into different planes, means connectitng said tabs and said gripper, said means further including a control assembly having angularly disposed arms selectively positionable in the path of travel of one or the other of said tabs for engaging one of said tabs to rotate said gripper in one direction and for engaging the other of said tabs to rotate said gripper in the other direction.

6. A clutch comprising a driving member, a driven member mounted in concentric relation to said driving member characterized by the provision of at least one gripper rotatably mounted on said driving member and eccentrically mounted with respect to its axis of rotation on said driving member, and means for selectively rotating said gripper into locking engagement with said driven member for drivingly connecting said driving member and said driven member, said means including a control mechanism having a ring disposed in surrounding relation to said gripper and having a pair of diametrically opposed tabs extending axially in opposite directions into different planes, a first pair of arms pivotally connecting said ring to said driving member, one of said arms being attached to said gripper, said first-named means further including a control assembly having a second pair of arms each of which is disposed in the plane of one of said tabs, said second pair of arms being rotatable in unison through a predetermined arc so that one or the other is in the path of travel of one of said tabs whereby said one of said tabs is engaged, the ring is moved to an eccentric position with respect to the axis of rotation of said driving member and the gripper is rotated in one direction or the other.

7. A clutch comprising a driving member, a driven member mounted in concentric relation to said driving member characterized by the provision of a pair of grippers rotatably mounted on said driving member and eccentrically mounted with respect to their axes of rotation on said driving member, and means for selectively rotating said gripper into locking engagement with said driven member for drivingly connecting said driving member and said driven member, said means including a control mechanism comprising a ring having inwardly extending ears, a first pair of arms pivotally connected at one end to each of said ears and at the other end to said driving member, each of said grippers being formed integrally with each arm of said first pair of arms, a reaction member formed integrally with each arm of the other of said pairs, said ring being provided with oppositely directed tabs extending into different planes, said first-named means including a control assembly having a second pair of arms selectively engageable with said tabs whereby said first pair of arms may be rotated in one direction in a manner to afford locking engagement of said grippers with said driven member and may be rotated in the other direction to effect unlocking of said grippers.

8. A clutch in accordance with claim 7 wherein said ring is of irregular configuration and said tabs are elongated.

9. A clutch comprising a driving member, a driven member mounted in concentric relation to said driving member, a plurality of grippers rotatably mounted on said driving member and eccentrically mounted with respect to their axes of rotation on said driving member, means connecting said grippers each to the other, and means including a control mechanism for selectively rotating said grippers into locking engagement with said driven member for drivingly connecting said driving member and said driven member, said control mechanism including a ring disposed in surrounding relation to said driving and driven members and provided with a pair of diametrically opposed peripheral tabs extending axially oppositely, a first arm pivotally connected at one end to said ring and at the other end to said driving member, said first arm being attached to one of said grippers in a manner to rotate said one of said grippers, a second arm pivotally connected at one end to said ring and at the other end to said driving member, said ring being rotatable in one position in which one of said tabs describes a circle of a diameter greater than the diameter of said ring while the other of said tabs describes a circle of less diameter than the diameter of said ring and being shiftable to another position in which said one of said tabs describes a circle of less diameter than the diameter of said ring while said other of said tabs describes a circle of greater diameter than the diameter of said ring, said second-named means further including a control assembly having a first arm coplanar with said one of said tabs and a second arm coplanar with said other of said tabs, said arms being rotatable in unison through a predetermined arc so that said first arm or said second arm engages the outermost of said tabs to rotate said grippers into or out of engagement with said driven member.

10. A clutch comprising a driving member, a driven member concentric therewith, a gripper rotatably mounted on said driving member and eccentrically mounted with respect to its axis of rotation on said driving member, a control ring secured to said gripper, said control ring having a pair of axially oppositely extending peripheral tabs, and a control assembly including a pair of angularly spaced arms selectively rotatable in unison to engage one or the other of said tabs to rotate said gripper into or out of engagement with said driven member.

11. A clutch comprising a rotatable driving member, a driven member mounted in concentric relation to said driving member, said driving member including a drive plate, a pin secured to said drive plate and adapted to revolve with said driving member relative to said driven member, a gripper eccentrically journalled on said pin, means for rotating said gripper for selectively affording a driving connection between said driving member and said driven member, said means including a control ring connected to said gripper and having an intermediate position concentric with the axis of said driving and said driven members, said ring being shiftable to eccentric positions with respect to the axis of rotation of said driving member in which positions the effect of centrifugal force on said ring is accentuated, and means for initiating movement of said ring to the eccentric positions.

12. A clutch comprising a rotatable driving member, a concentrically disposed driven member, at least one rotatably mounted gripper arranged between said driving member and said driven member and adapted to be revolved by said driving member, means for selectively rotating said gripper into engagement with said driven member, said means including a control mechanism comprising a ring connected to said gripper, said ring being shiftable to one eccentric position with respect to the axis of rotation of said driving member for rotation of said gripper in one direction and shiftable to another eccentric position with respect to the axis of rotation of said driving member for rotation of said gripper in the other direction, said means further including a control assembly for effecting shifting of said ring.

13. A clutch comprising a rotatable driving member, a concentrically disposed driven member, at least one rotatably mounted gripper arranged between said driving member and said driven member and adapted to be revolved by said driving member, means for selectively rotating said gripper into engagement with said driven member, said means including a control mechanism comprising a ring connected to said gripper, said ring being shiftable to one eccentric position with respect to the axis of rotation of said driving member for rotation of said gripper in one direction and shiftable to another eccentric position with respect to the axis of rotation of said driving member for rotation of said gripper in the other direction, said means further including a control assembly for effecting shifting of said ring, said control assembly comprising a pair of angularly spaced arms rotatable in unison for selectively engaging predetermined portions of said ring to urge said ring into one or the other of the eccentric positions.

14. A clutch comprising a rotatable driving member, a concentrically disposed driven member, a plurality of rotatably and eccentrically mounted grippers arranged between said driving member and said driven member and adapted to be revolved by said driving member, and means for selectively rotating said grippers in unison into engagement with said driven member, said means including a control mechanism comprising a ring connected to said grippers, said ring being shiftable to one eccentric position with respect to the axis of rotation of said driving member for rotation of said gripper in one direction and shiftable to another eccentric position with respect to the axis of rotation of said driving member for rotation of said gripper in the other direction, said means further including a control assembly for effecting shifting of said ring.

15. A clutch comprising a driving member, a driven member mounted in concentric relation to said driving member, said driving member including a drive plate, a pin secured to said drive plate and adapted to revolve with said driving member and relative to said driven member, a gripper eccentrically journalled on said pin, and means for rotating said gripper for selectively affording a driving connection between said driving member and said driven member.

16. A clutch comprising a driving member, a driven member, said driving member including a sleeve adapted to be fixed to a motor shaft, a radially outwardly extending drive plate fixed to said sleeve so as to rotate therewith, said driven member being concentric with said driving member and having an outwardly extending radial flange, an output plate fixed to the flange of said driven member, a gripper rotatably mounted on said drive plate and eccentrically mounted with respect to its axis of rotation on said drive plate so as to revolve with said driving member and relative to said driven member as drive plate rotates, a control mechanism concentrically mounted with respect to said driving member, said control mechanism being connected to said gripper and operative upon actuation to rotate said gripper into or out of engagement with said driven member, and a control assembly selectively operable to actuate said control mechanism.

17. A clutch comprising a driving member, a driven member, said driving member including a sleeve adapted to be fixed to a motor shaft, a radially outwardly extending drive plate fixed to said sleeve so as to rotate therewith, said driven member being concentric with said driving member and having an outwardly extending radial flange, an output plate fixed to the flange of said driven member, at least one gripper rotatably mounted on said drive plate so as to revolve with said driving member and relative to said driven member as said drive plate rotates, said gripper being eccentric with respect to the axis of rotation thereof, a control mechanism connected to said gripper and operative upon actuation to rotate said gripper into or out of engagement with said driven member, and a control assembly selectively operable to actuate said control mechanism.

18. A clutch comprising a rotatable driving member, a driven member, said driving member including a sleeve adapted to be fixed to a motor shaft, a radially outwardly extending drive plate fixed to said sleeve so as to rotate therewith, said driven member being concentric with said driving member and having an outwardly extending radial flange, an output plate fixed to the flange of said driven member, a plurality of grippers rotatably mounted on said drive plate so as to revolve with said driving member and relative to said driven member as said drive plate rotates, each of said grippers being eccentric with respect to the axis of rotation thereof, a control mechanism connected to said grippers and operative upon actuation to rotate said grippers into or out of engagement with said driven member, and a control assembly selectively operable to actuate said control mechanism.

19. A clutch comprising a driving member, a driven member, said driving member including a sleeve adapted to be fixed to a motor shaft, a radially outwardly extending driving plate fixed to said sleeve so as to rotate therewith, said driven member being concentric with said driving member and having an outwardly extending radial flange, an output plate fixed to the flange of said driven member, a plurality of grippers rotatably mounted on said drive plate so as to revolve with said driving member and relative to said driven member as said drive plate rotates, each of said grippers being eccentric with respect to the axis of rotation thereof, means interconnecting said grippers, a control mechanism connected to said grippers and operative upon actuation to rotate said grippers into or out of engagement with said driven member, and a control assembly selectively operable to actuate said control mechanism.

References Cited in the file of this patent

UNITED STATES PATENTS

| | | |
|---|---|---|
| 513,148 | Salomon | Jan. 23, 1894 |
| 1,137,507 | McKeever | Apr. 27, 1915 |
| 1,472,479 | Lindgren | Oct. 30, 1923 |
| 1,745,738 | Carter | Feb. 4, 1930 |
| 1,938,997 | Burroughs | Dec. 12, 1933 |
| 2,002,478 | Roberts | May 21, 1935 |
| 2,258,393 | Simmonds | Oct. 7, 1941 |
| 2,398,885 | Dodge | Apr. 23, 1946 |
| 2,512,738 | Dixon et al. | June 27, 1950 |

FOREIGN PATENTS

| | | |
|---|---|---|
| 361,473 | France | July 17, 1906 |
| 120,981 | Sweden | Feb. 24, 1948 |
| 986,086 | France | Mar. 21, 1951 |